(12) United States Patent
Hansen

(10) Patent No.: US 6,796,006 B2
(45) Date of Patent: Sep. 28, 2004

(54) RIB CLIP

(75) Inventor: Wayne Hansen, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 4 days.

(21) Appl. No.: 10/131,907

(22) Filed: Apr. 25, 2002

(65) Prior Publication Data

US 2003/0200634 A1 Oct. 30, 2003

(51) Int. Cl.$^7$ ............................................... E04F 19/02
(52) U.S. Cl. ............................................ 24/297; 24/289
(58) Field of Search .................... 24/289–297; 411/508, 411/509, 913

(56) References Cited

U.S. PATENT DOCUMENTS

| | | | |
|---|---|---|---|
| 2,499,637 A | | 3/1950 | Flora |
| 2,574,330 A | * | 11/1951 | Judd .......................... 403/107 |
| 3,208,119 A | | 9/1965 | Seckerson |
| 3,977,048 A | | 8/1976 | Benedetti |
| 4,176,428 A | * | 12/1979 | Kimura ........................ 24/326 |
| 4,382,414 A | | 5/1983 | Svirklys |
| 4,402,118 A | | 9/1983 | Benedetti |
| 4,644,612 A | | 2/1987 | Osterland |
| 4,716,633 A | * | 1/1988 | Rizo ............................ 24/453 |
| 4,778,320 A | | 10/1988 | Nakama |
| 5,367,752 A | | 11/1994 | Petty |
| 5,718,549 A | * | 2/1998 | Noda et al. ................. 411/553 |
| 5,754,412 A | * | 5/1998 | Clavin ........................ 361/804 |
| 5,966,782 A | | 10/1999 | Ishihara et al. |
| 6,049,952 A | | 4/2000 | Mihelich et al. |
| 6,074,150 A | | 6/2000 | Shinozaki et al. |
| 6,101,686 A | | 8/2000 | Velthoven et al. |
| 6,119,316 A | | 9/2000 | Ishihara et al. |
| 6,119,916 A | | 9/2000 | Anderson et al. |
| 6,141,837 A | | 11/2000 | Wisniewski |
| 6,317,937 B1 | | 11/2001 | Ishihara et al. |
| 6,405,413 B2 | * | 6/2002 | Ichimaru ..................... 24/297 |

FOREIGN PATENT DOCUMENTS

| | | | |
|---|---|---|---|
| JP | 411030214 A | * | 2/1999 |
| JP | 411287221 A | * | 10/1999 |
| JP | 0200205214 A | * | 7/2000 |
| JP | 02001289217 A | * | 10/2001 |
| JP | 02001330011 A | * | 11/2001 |
| JP | 02002155916 A | * | 5/2002 |

* cited by examiner

Primary Examiner—J. J. Swann
Assistant Examiner—Ruth C. Rodriguez
(74) Attorney, Agent, or Firm—Leffert Jay & Polglaze, P.A.

(57) ABSTRACT

A retaining clip comprising a U-shaped body having a pair of legs that are flexibly connected at their bottom ends and spaced apart to receive therebetween a blade fastener is herein disclosed. Each of the legs of the retaining clip has a head projection that extends laterally from its top end and a cooperating pair of detent structures, each extending laterally from the exterior surface of the respective legs at a predetermined distance below the head projections. Retaining tabs are disposed within and extend inwardly from respective tab apertures formed through each of the legs. These retaining tabs are inclined toward the bottom ends of the legs and are constructed and arranged to easily allow a blade fastener to be inserted therebetween and to subsequently engage the blade fastener to securely retain the blade fastener within the retaining clip. The retaining tabs are constructed and arranged to oppose any forces that would tend to withdraw the blade fastener from the retaining clip substantially in compression.

26 Claims, 6 Drawing Sheets

RIB CLIP

FIELD OF THE INVENTION

The present invention is drawn to a retaining clip useful in forming a "blind" connection between a first panel and a second panel.

BACKGROUND OF THE INVENTION

When making a blind connection between a first panel, typically the sheet metal framework of an automobile or the like, and a second panel, often an interior panel of the same automobile, it is well-known to use a simple metal retaining clip that can be received within a window or aperture formed through the first panel and that will engage therein a fastener that extends from an undersurface of the second panel. Such prior art metal retaining clips are deficient in that the abrasive nature of the metal retaining clips often wears through the paint or anticorrosive coatings of the primary panel, thereby promoting corrosion. In addition, metal retaining clips have a distinct tendency to buzz, squeak, and rattle, a condition typically referred to as BSR. In an effort to reduce or eliminate BSR and to prevent corrosion, plastic fasteners have been used to replace the prior art metal retaining clips. Unfortunately, these plastic retaining clips tend to be relatively complex, require complex tooling and molding operations, and have moderately high insertion forces required to seat a blade fastener therein.

In light of these deficiencies, it would be desirable to provide a retaining clip that may be constructed of non-abrasive materials such as plastic and the like using relatively simple and inexpensive molds and which has a relatively low insertion force.

SUMMARY OF THE INVENTION

The present invention is realized in a retaining clip having a U-shaped body with a pair of legs that are flexibly connected at their bottom ends. These legs are spaced apart sufficiently to receive therebetween a blade fastener that typically extends from the backside of a panel that is to be assembled with yet another panel, such as where the interior panels of an automobile are secured to the framework of the automobile. The retaining clip also has a pair of head projections that extend laterally from the top ends of the respective legs and a pair of detent structures that also extend laterally from exterior surfaces of the respective legs at a predetermined distance from the head projection of each of those legs. Each of the legs of the retaining clip has a tab aperture formed therethrough within which is disposed a retaining tab. These retaining tabs are essentially cantilever structures, are inclined inwardly from the legs of the retaining clip, and may be deflected to permit the blade fastener to be received between the legs of the retaining clip. The tips of the retaining tabs are constructed and arranged to engage an aperture formed through the blade fastener in such a manner as to prevent the withdrawal of the blade fastener from between the legs of the retaining clip. The retaining tabs oppose any forces applied to the blade fastener that would tend to withdraw the blade fastener from within the retaining clip substantially in compression. Note that the hold that the retaining tabs maintain upon the blade fastener exceeds the strength of the hold maintained by the retaining clip on the panel into which it has been inserted. Note also that it is often desirable to be able to withdraw the retaining clip from a window in which it is seated for servicing of the panels that the retaining clip serves to connect. In this case, it may be desirable to include with the retaining clip a pair of support bars that are secured across the respective tab apertures and to the retaining tabs themselves. In this way opposing forces engendered within the retaining tabs are applied to the legs of the retaining clip nearer the bottom of the legs to reduce the outwardly directed component of the opposing forces that acts to secure the retaining clip in a window formed through a first panel.

The retaining tabs of the retaining clip of the present invention preferably form an acute angle with the blade fastener when the blade fastener has been engaged therein. In addition, the tips of the retaining tabs are constructed and arranged to either engage each other through the aperture formed through the blade fastener or to engage an edge or lip of the aperture formed through the blade fastener itself in order to offset lateral forces applied to the retaining tabs by the blade fastener.

While the preferred embodiment of the present invention has a single pair of retaining tabs, it is envisioned that the retaining clip may comprise multiple pairs of retaining tabs. In addition, the present invention may be adapted such that the blade fastener has a width much greater than its height. Such a blade fastener may be engaged by a single retaining clip having similar dimensions, or by multiple retaining clips having a single pair of retaining tabs or multiple pairs of retaining tabs. In any case, the magnitude of force required to insert the blade fastener into the retaining clip is relatively low, and typically is about two pounds.

The present invention may also be characterized as a mechanism for securing together a first and a second panel. This mechanism comprises a retaining clip that has a U-shaped body formed of a pair of legs that are flexibly connected at their bottom ends. The legs are spaced apart from one another sufficiently to receive therebetween a blade fastener that is secured to a second panel. Each of the legs has extending laterally from an exterior surface thereof a head projection and a detent structure. The head projection extends laterally from an upper end of each leg whereas the detent structure is positioned below the head projection a predetermined distance therefrom. Each of the legs also has formed therethrough a tab aperture having disposed therein a retaining tab. Each of the retaining tabs extends from adjacent the head projection inwardly toward the bottom of the legs. These retaining tabs are constructed and arranged to permit the blade fastener of the second panel to be inserted between the legs but to thereafter engage the blade fastener in such a manner that a withdrawal force applied to the blade fastener will be opposed by the retaining tabs substantially in compression. Preferably, these retaining tabs will form an acute angle with the blade fastener as the withdrawal force is applied thereto. In use, the retaining clip is first engaged with the blade fastener and the assembled mechanism is then inserted into a window formed through the second panel to secure the first and second panels together.

In another embodiment of the present invention, the tips of the retaining tabs may be notched to engage the aperture formed through the blade fastener. Alternatively, the retaining tabs may be constructed and arranged to engage a blade fastener that is provided with a series of ridges in its exterior surface in lieu of an aperture.

DETAILED DESCRIPTION OF THE INVENTION

Although the disclosure hereof is detailed and exact to enable those to practice the invention, the physical embodiments herein disclosed merely exemplify the invention, which may be embodied in other specific structures. While the preferred embodiment has been described, the details may be changed without departing from the invention, which is defined by the claims.

Figure 1:
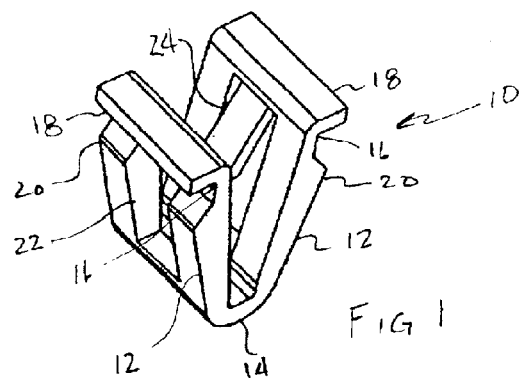
FIG. 1 is a perspective view of the retaining clip of the present invention.
Figure 2:
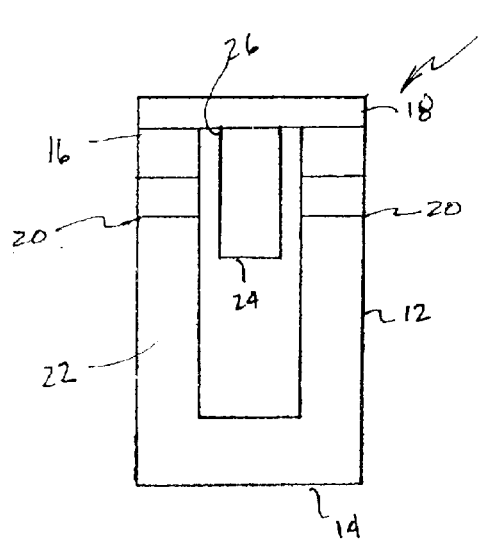
FIG. 2 is a side elevation of the retaining clip of FIG. 1.
Figure 3:
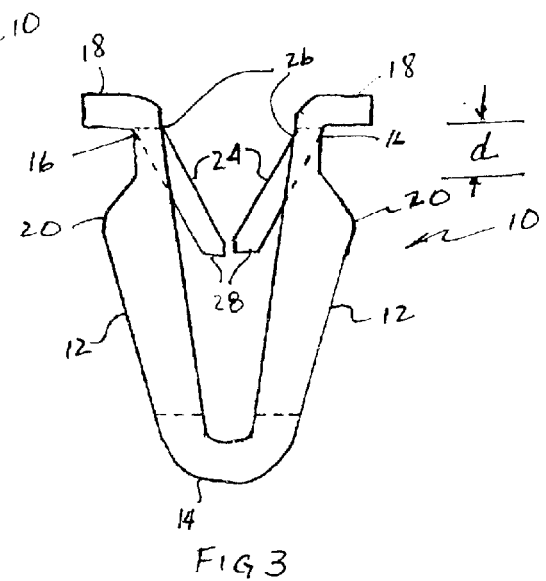
FIG. 3 is cut away side elevation of the retaining clip of the present invention taken along cutting lines 3—3 shown in FIG. 2.

FIGS. 1–3 illustrate a retaining clip 10 of the present invention from various angles. The retaining clip 10 essentially comprises a pair of legs 12 that are resiliently connected at their bottom ends 14 to form a U-shaped body. Each of the legs 12 has extending laterally therefrom at its top end 16 a retaining head 18. In addition, each of the legs 12 has formed into an exterior surface thereof a detent structure 20. This detent structure is spaced a predetermined distance d from the undersurface of the retaining heads 18. As can be seen from the Figures, legs 12 are angled or biased outwardly to form an acute angle with one another.

Each of the legs 12 has an aperture 22 formed therethrough. While the exact size and shape of the aperture 22 may vary from application to application of the present invention, in a preferred embodiment, the aperture has an upper end that begins at the retaining heads 18 and extends to the bottom 14 of the retaining clip 10. Within each of the apertures 22 of each leg 12 there exists a retaining tab 24. The retaining tabs 24 are connected at their base end 26 to the upper surface of the aperture 22 proximate the retaining head 18. The retaining tabs extend inwardly of the legs 12 into the U-shaped space formed therebetween. It is preferred that the retaining tabs 24 be symmetrical with one another. The tips 28 of each retaining tab may be of any suitable shape, but are preferably provided with at least one sharp edge.

Figure 4:
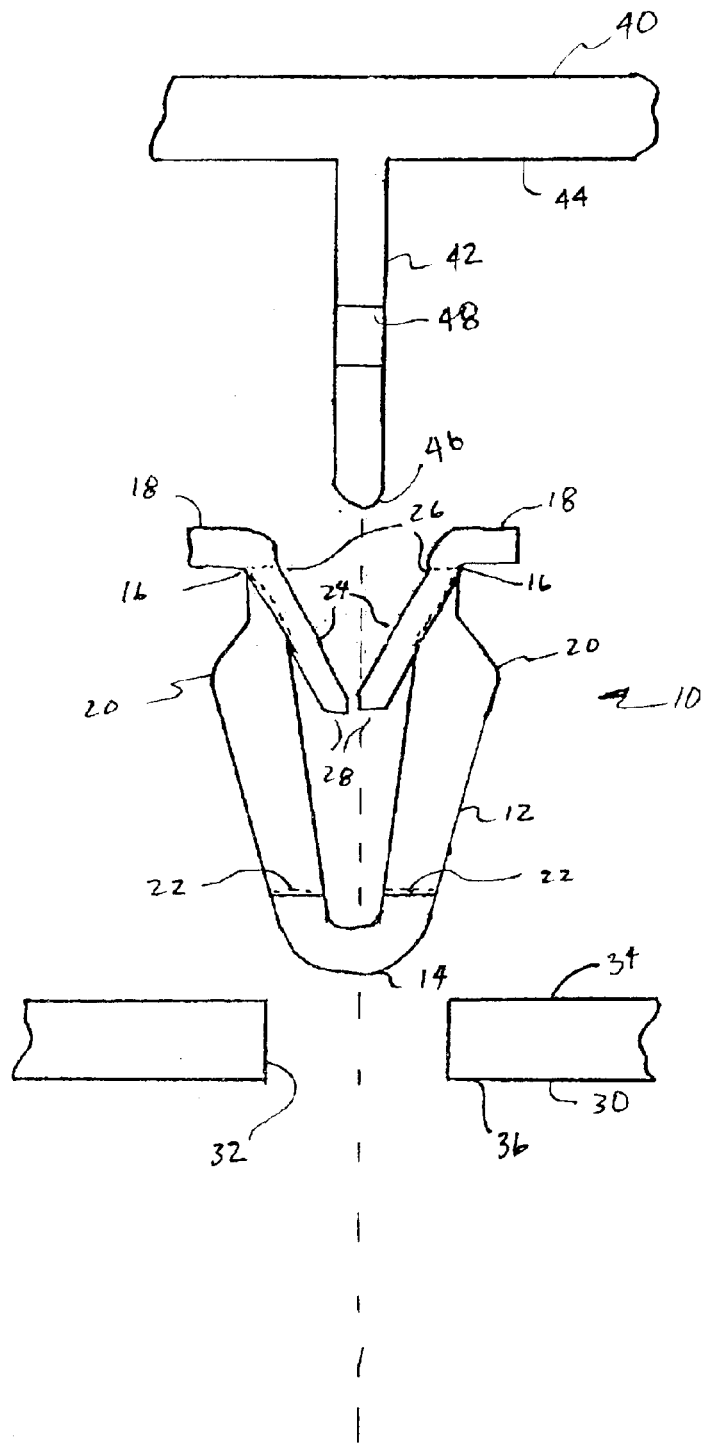
FIG. 4 is a schematic representation of the retaining clip of the present invention shown in relation to a window formed through a first panel and a blade fastener extending from a second panel.

FIG. 4 illustrates the retaining clip 10 in relation to a window 32 formed through a first panel 30. Note that the window 32 is typically rectangular and will have a size that is complementary to that of the retaining clip 10 so that the retaining clip 10 may be inserted and retained therein. Note that the thickness of the first panel 30 will dictate the distance d between the retaining head 18 and the detent structure 20 of each leg 12. In use, the retaining clip 10 is first engaged with the blade fastener 42. Once the retaining clip 10 is assembled with the blade fastener 42 as a "part-in-assembly" or PIA, the retaining clip 10 may be inserted into the window 32. As the retaining clip 10 is inserted into the window 32, the legs 12 will be biased inward to permit the U-shaped body of the retaining clip 10 to pass therethrough. As the retaining heads 18 of the retaining clip 10 contact the upper surface 34 of the first panel 30, the resilient structure of the retaining clip will bias the legs 12 outwardly such that the detent structures 20 will engage the undersurface 36 of the first panel 30.

As can be appreciated, the detent structure 20 may have many useful shapes; however, it is preferred to form the detent structure 20 into a gradually outwardly extending structure that can accommodate first panels 30 of varying thickness. In general, the thickness of the panel 30 will be the same as or slightly greater than the distance d between the detent structure 20 and the retaining head 18 of the retaining clip 10. In this manner, the BSR associated with loose retaining clips may be minimized or completely avoided.

The connection between the first and second panels 30, 40 will generally be a blind connection, i.e., the blade fastener 42 and the PIA retaining clip 10 extend from an undersurface 44 of the second panel 40 and cannot be seen by one who is assembling the second panel 40 with the first panel 30. It is to be understood, however, that the present invention may be adapted for use with structures other than the first and second panels 30, 40 that do not require the blind connection described herein. Accordingly, the present invention is not to be limited to only blind connections. In addition, it may also prove useful to assemble first and second panels 30, 40 by first inserting the retaining clip 10 into the window 32 in the first panel 30 and subsequently inserting the blade fastener 42 into the retaining clip 10.

Figure 5:
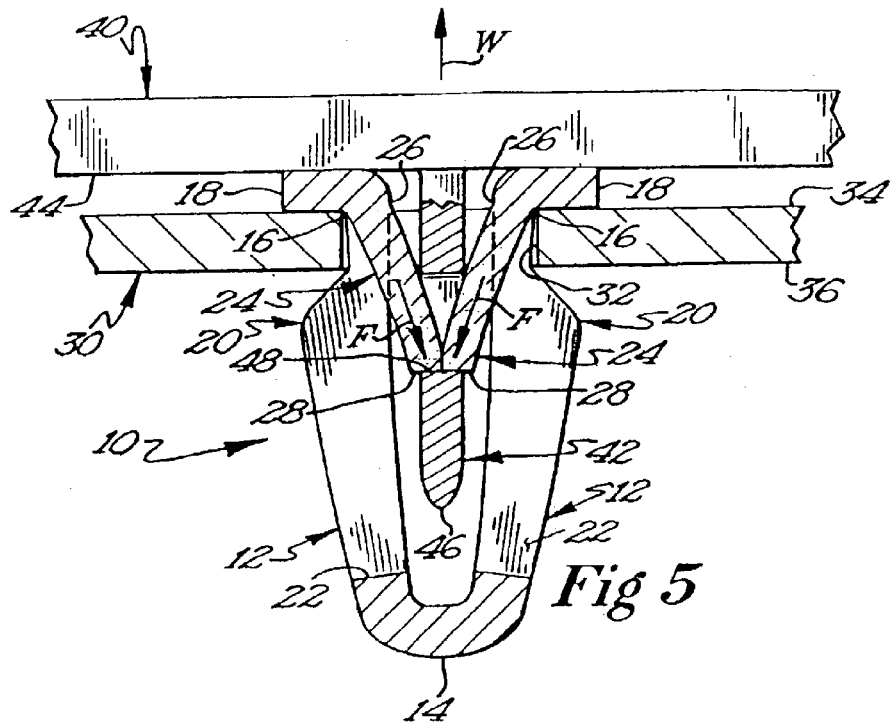
FIG. 5 is a partial, schematic view of the retaining clip of the present invention illustrating how the retaining tabs thereof secure a blade fastener therein.

FIG. 5 illustrates how the blade fastener 42 is retained within the retaining clip 10 of the present invention. As can be seen, the blade fastener 42 is inserted fully into the U-shaped channel formed between the legs 12 of the retaining clip 10. Note that the legs 12 are spaced apart sufficiently such that when the retaining clip 10 is received within the window 32 in the first panel 30, the blade fastener 42 may thereafter be inserted between the legs 12. Note also that FIG. 5 is a schematic illustration of the present invention and the dimensions and clearances shown are not to be taken as a literal representation of the preferred embodiments.

As the blade fastener 42 is inserted between the legs 12 of the retaining clip 10, the retaining tabs 24 will be resiliently biased outwardly by the tip 46 of the blade fastener 42. When the undersurface 44 of the second panel contacts the upper surface of the retaining heads 18 or is sufficiently close to the retaining heads 18, the tips 28 of the retaining tabs 24 will return to their first, unbiased position as the aperture 48 formed through the blade fastener 42 is moved into the position illustrated in FIG. 5. The aperture 48 of the blade fastener 42 may be of any suitable size or shape, with the sole requirement being that the aperture 48 must be constructed and arranged to engage the tips 28 of the retaining tabs 24 of the retaining clip 10. Once the blade fastener 42 is fully seated within the retaining clip 10, the retaining tabs 24 act to prevent the second panel 40 from being withdrawn therefrom. More specifically, where a withdrawal force indicated by arrow W is applied to the second panel 40, the retaining tabs 24 will generate opposing forces indicated by arrows F. Whereas the withdrawal force W is directed in a substantially normal direction from the first panel 30 within which the retaining clip 10 is received, the opposing forces F which oppose the withdrawal force W are directed substantially along the length of the retaining tabs 24 and at an acute angle to one another. As can be appreciated, the sum of the vertical components of the opposing forces F engendered within the retaining tabs 24 will balance and counteract the withdrawal force W applied to the second panel 40. The retaining tabs 24 are further constructed and arranged such that as a result of the withdrawal force W, the tips 28 of the retaining tabs 24 will contact one another such that the horizontal components of the opposing forces F engendered within each of the retaining tabs 24 will oppose one another and cancel each other out. The tips 28 of retaining tabs 24 preferably have formed therein a notch that will engage a lip or edge of the aperture 48. The tips 28 of the retaining tabs may also have formed therein a vertically aligned flat that allows the tips 28 of the retaining tabs 24 to directly engage one another through the aperture 48. Yet another embodiment of the retaining tabs 24 has tips 28 having sharp points or surfaces constructed and arranged to engage the surface of the blade fastener 42. In this embodiment, the blade fastener 42 may comprise an aperture 48, a roughened or grooved surface (not shown), or at least one relatively soft spot on the tip of the blade fastener 42 that the sharpened tips 28 of the retaining tabs 24 can dig into.

As the retaining tabs 24 are essentially cantilever structures that extend from the legs 12 of the retaining clip 10 proximate to the retaining heads 18 thereof, the flexible nature of the retaining tabs 24 permits a relatively low insertion force required to insert the blade fastener 42 into the retaining clip 10 of about two pounds. Nevertheless, because the retaining clips 10 are made from a material sufficiently rigid to prevent significant buckling of the retaining members 24, the retaining tabs 24 will act as a triangular or A-frame structural member that is quite strong. In addition, the hold that the retaining tabs 24 maintain on the blade fastener 42 will be stronger than the hold that retaining clip 10 has on the window 32 formed through the first panel 30. In this manner it is possible to disassemble the second panel 40 from the first panel 30 without damaging the blade fastener 42 or retaining clip 10.

Figure 6:
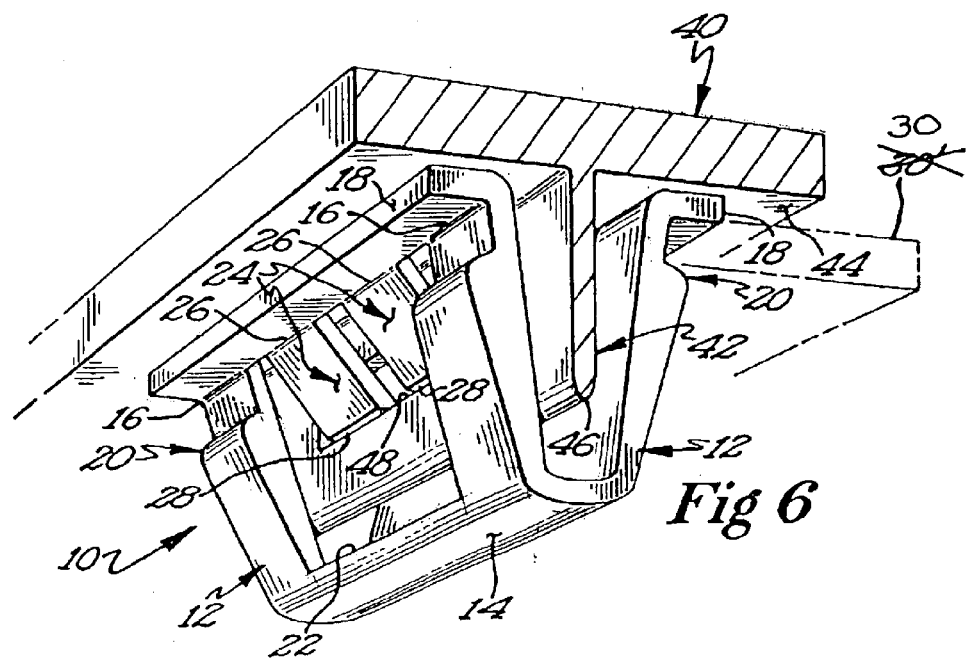
FIG. 6 is a perspective view of an alternate embodiment of the present invention showing a retaining clip with multiple pairs of retaining tabs having retained therein a blade fastener; and, FIG. 7 is a perspective view of an alternate embodiment of the retaining clip of the present invention further comprising support bars secured to the retaining tabs of the retaining clip.

In a preferred embodiment of the present invention, the retaining clip 10 will have a single pair of retaining tabs 24 that engage a single aperture 48 formed in a blade fastener 42. However, it is to be understood that the retaining clip 10 may comprise any number of retaining tabs 24 as shown in FIG. 6. The retaining tabs 24 of the retaining clip 10 may in turn engage a single aperture 48 formed through a blade fastener 42 or multiple apertures 48 formed through the blade fastener 42 as dictated by the particular application to which the assembly is directed. Furthermore, it is to be understood that while the blade fasteners 42 are herein disclosed as being of approximately the same width as the retaining clips 10, it is possible that the blade fasteners 42 may extend much wider than their height. For example, a blade fastener 42 may extend the entire length of a panel 40. As can be appreciated, the window 32 formed in a first panel 30 will be elongated to form a slot that is sized to receive the elongated alternate embodiment of the blade fastener 42. In this instance, the blade fastener 42 may be provided with a single aperture 48 running the length of the blade fastener 42, with a single aperture 48 located in a key position along the blade fastener 42, or with a plurality of apertures 48 located at predetermined locations along the width of the blade fastener 42. Similarly, the elongate alternate embodiment of the blade fastener 42 may be engaged by a single, elongated retaining clip 10 having a width approaching that of the blade fastener and having multiple pairs of retaining tabs 24 to secure the second panel 40 to a first panel 30. Alternatively, multiple retaining clips 10 having single pairs of retaining tabs 24 may be inserted into an elongate window 32 that is sized to receive the elongate blade fastener 42 at predetermined positions dictated by the position of the aperture of apertures 48.

Figure 7:
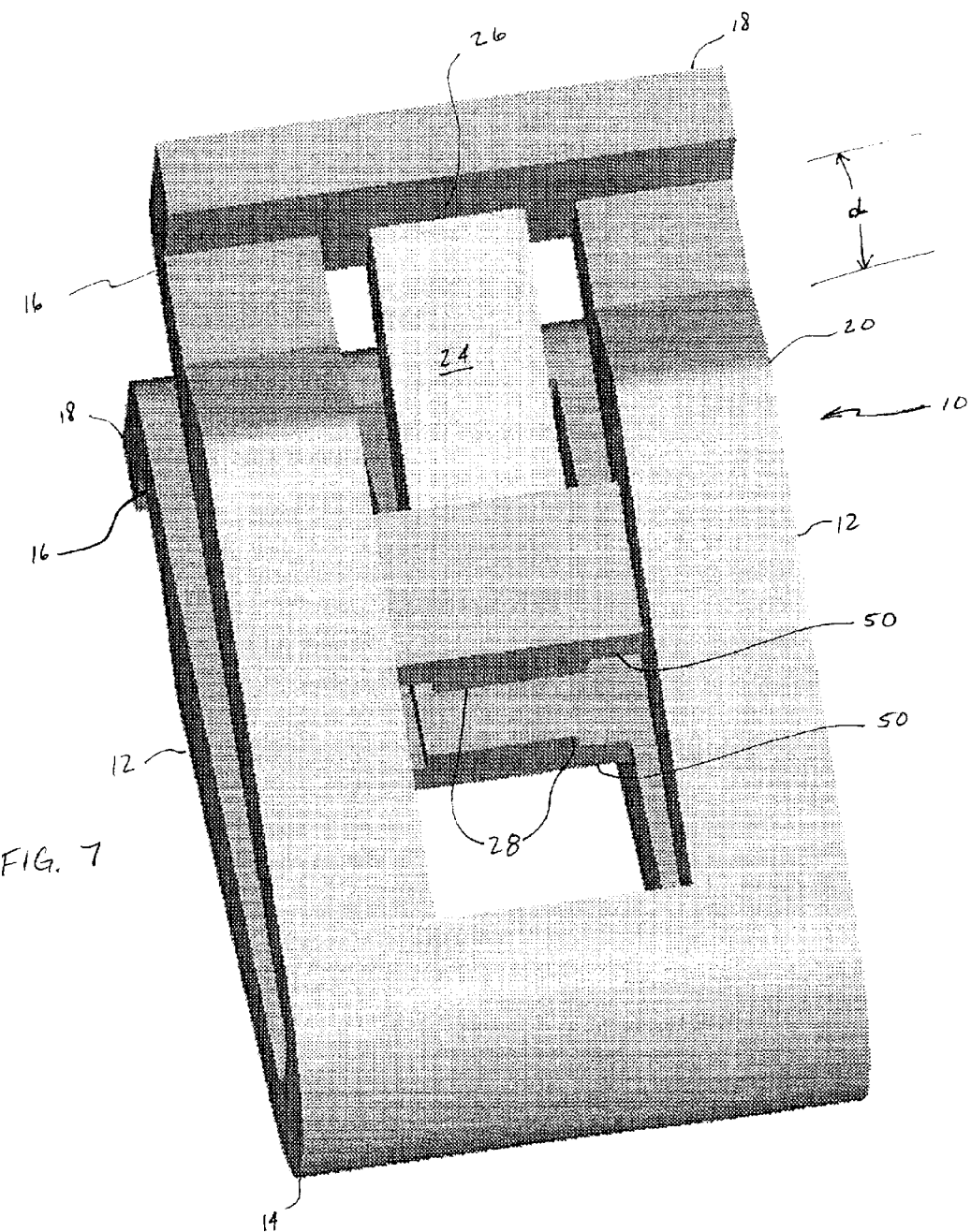
Figure 8:
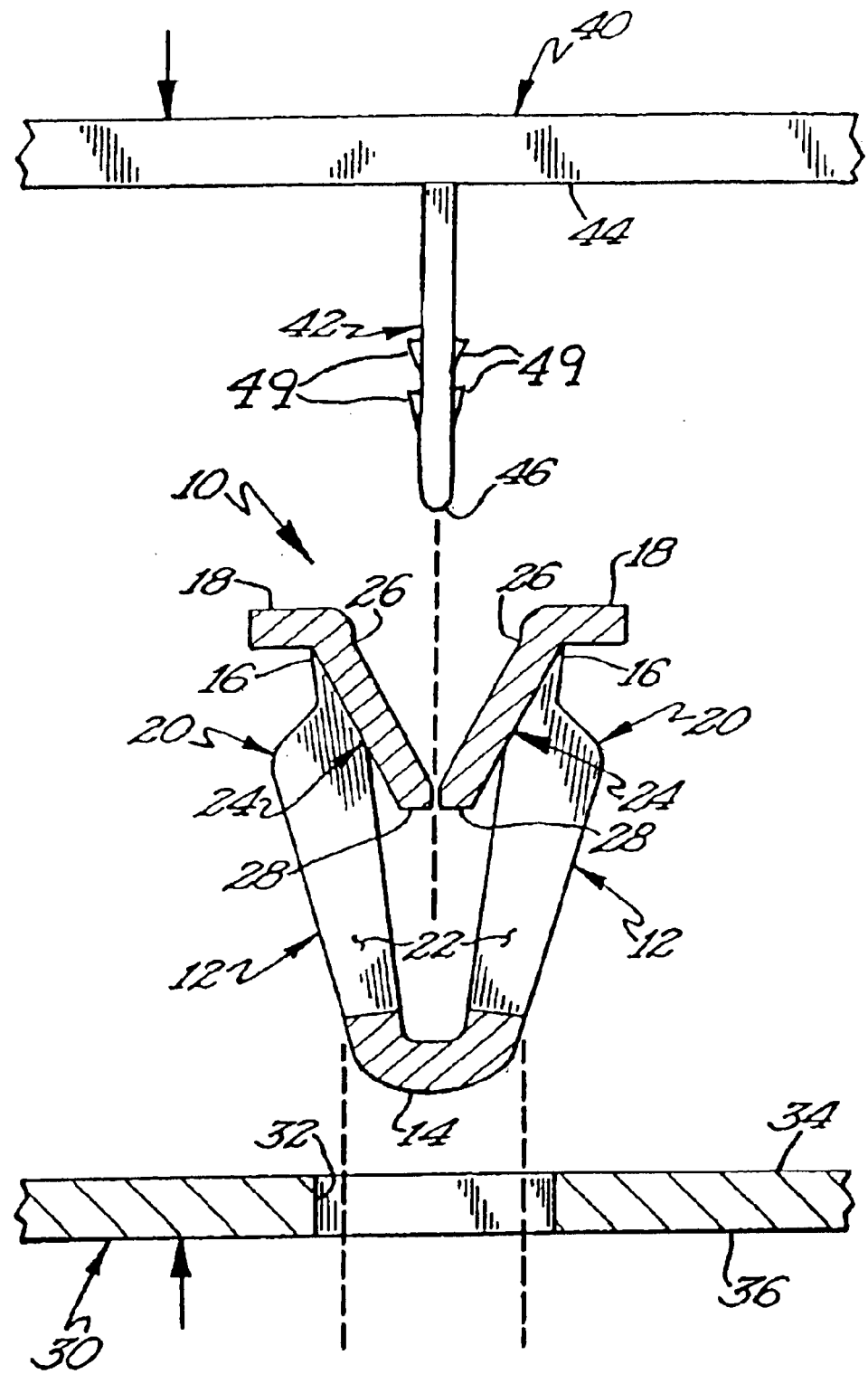
FIG. 8 is a cross-sectional exploded view of a retaining clip shown in relation to a blade fastener having multiple detents or ridges extending therefrom, the retaining tabs of the retaining clip being constructed and arranged to mate with the detents or ridges of the blade fastener.
Figure 9:
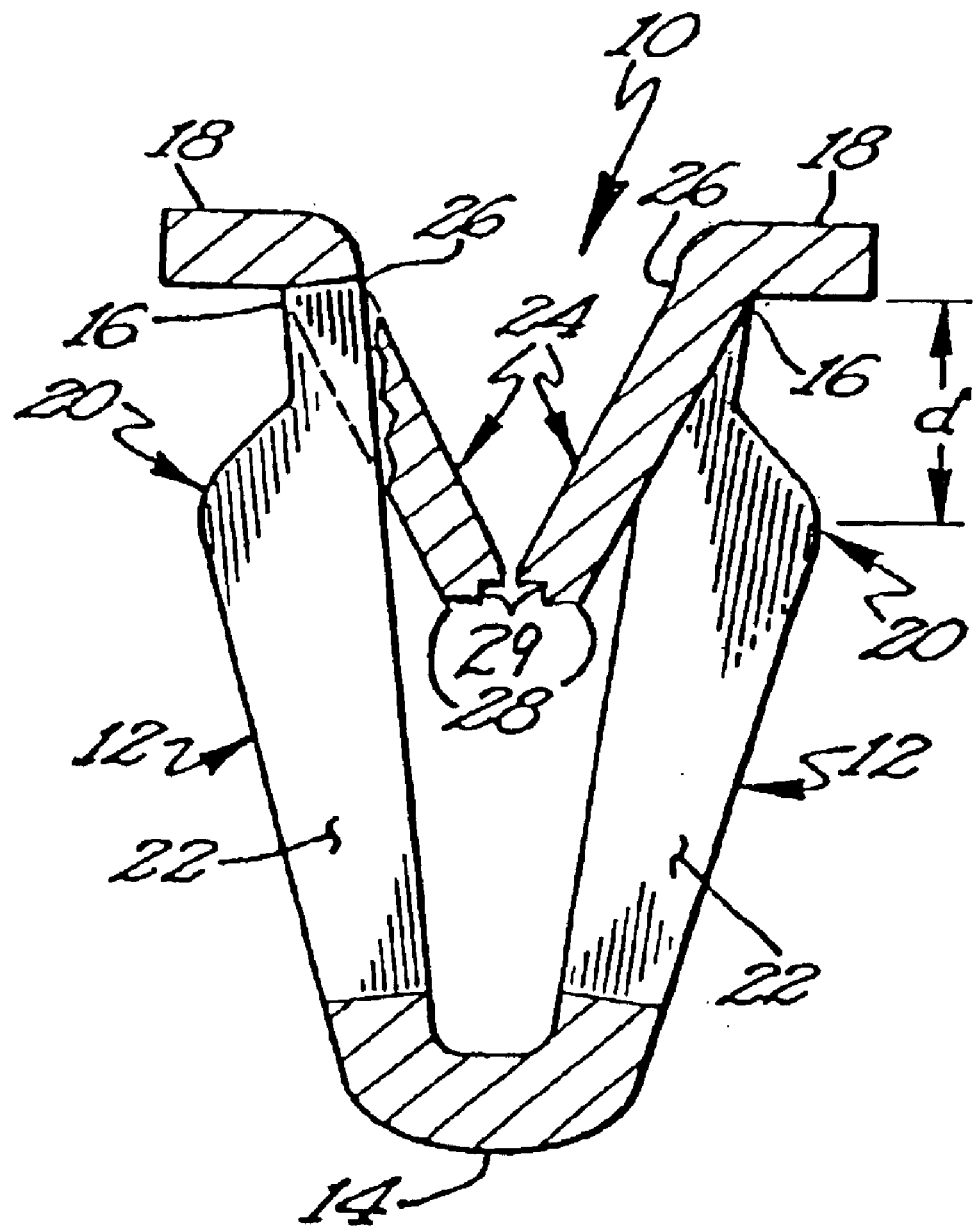
FIG. 9 is a cross-sectional view of a retaining clip having retaining tabs with notched tips.
Figure 4:
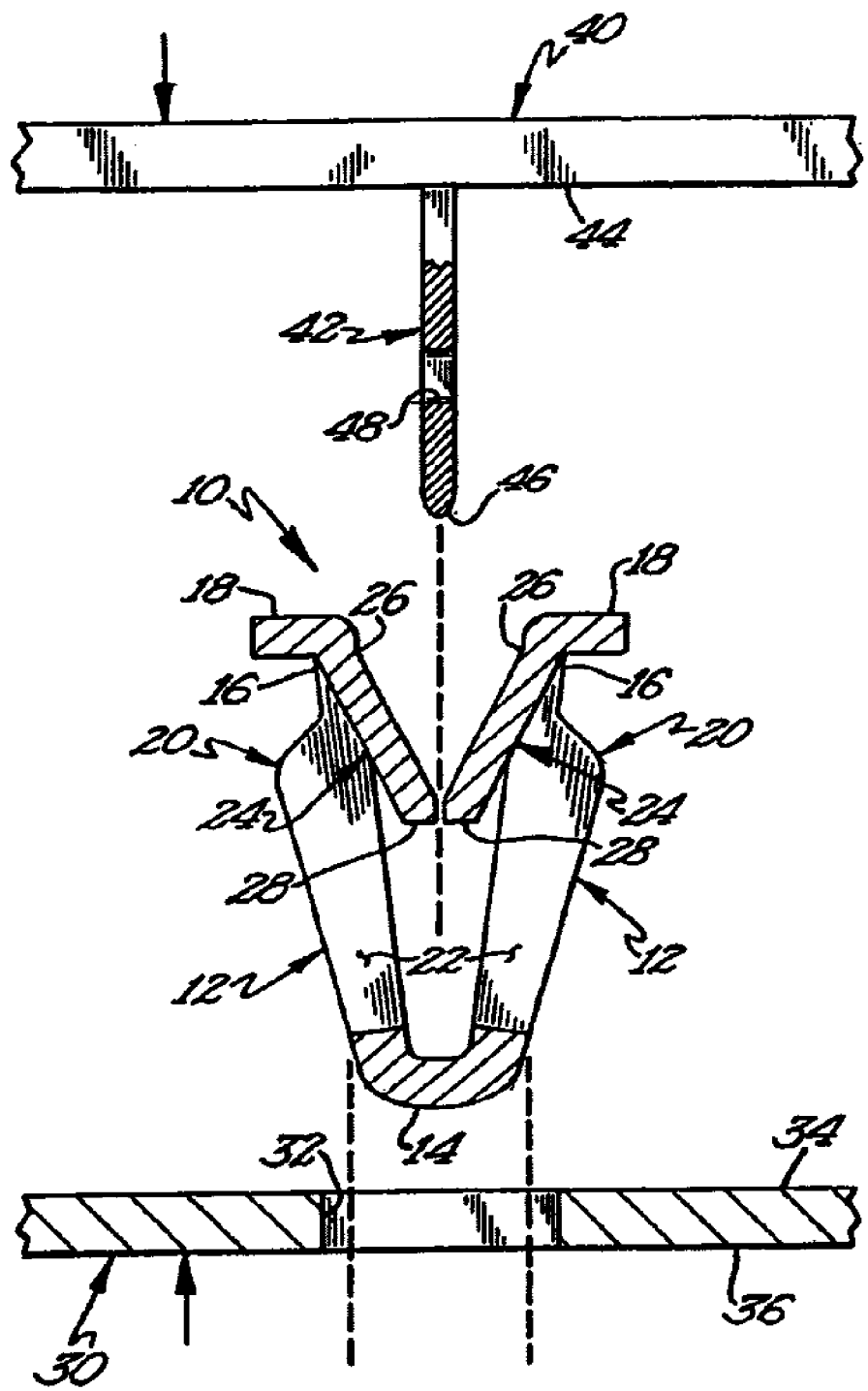
Figure 7:
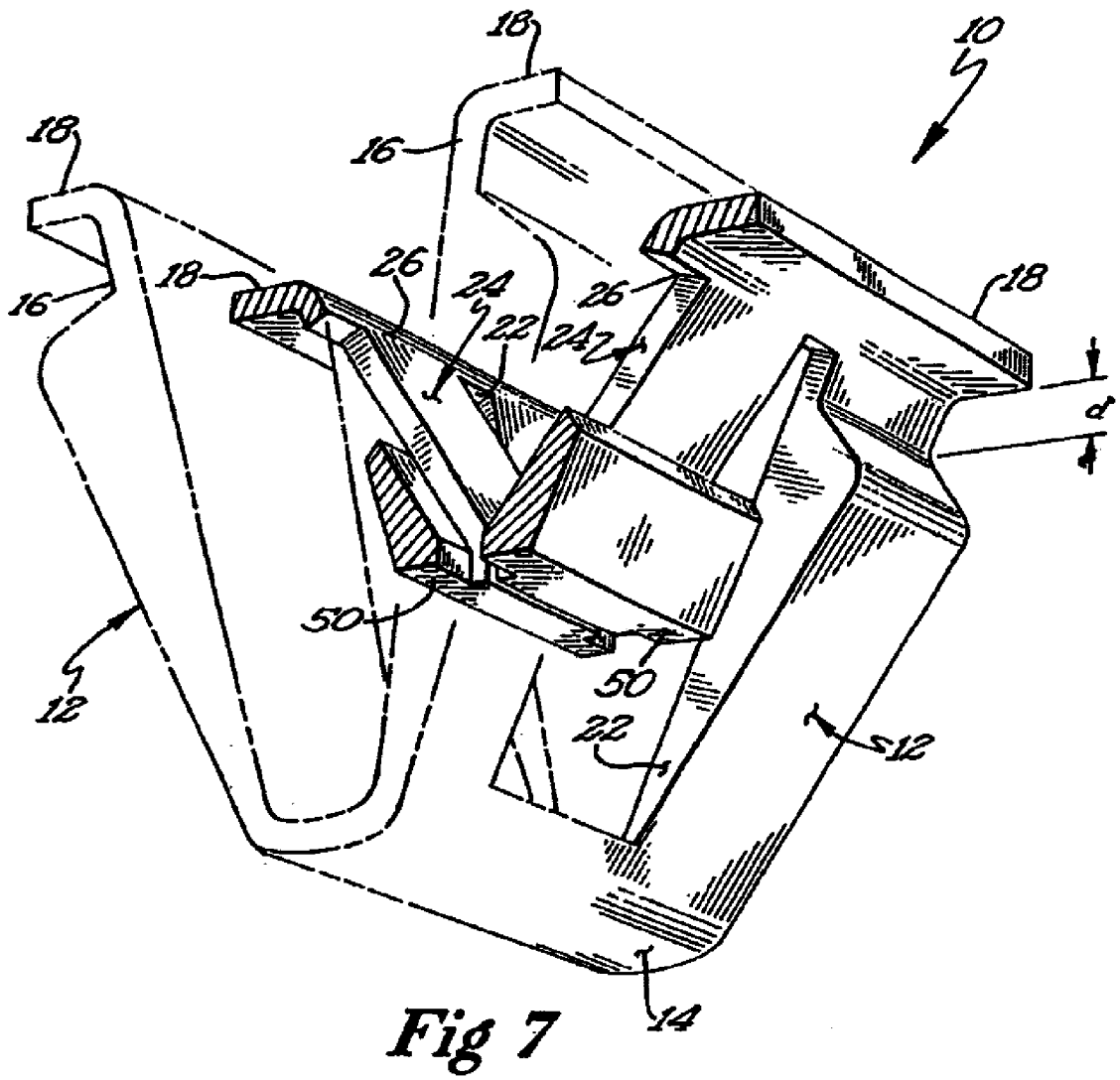

FIG. 7 illustrates an alternate embodiment of the present invention that further comprises a pair of support bars 50. Each support bar 50 is secured to a leg 12 across the tab aperture 22. The retaining tabs 24 are secured to the support bars 50 so as to transmit opposing forces engendered within the retaining tabs 24 by a withdrawal force directly to the legs nearer the bottom 14 of the legs 12. This may be particularly useful where the retaining clip 10 is used in metal first panels 30 that have sharp edges around window 32. The application of the opposing forces to the legs 12 below the head projections/retaining heads 18 reduces the outward forces applied to the legs 12 that cause the legs 12 and particularly the detent structures 20 to strongly engage the sharp edges of the window 32. This lowers the force required to remove the retaining clip 10 from the window 32 and permits easy access to the panels 30, 40 for servicing.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

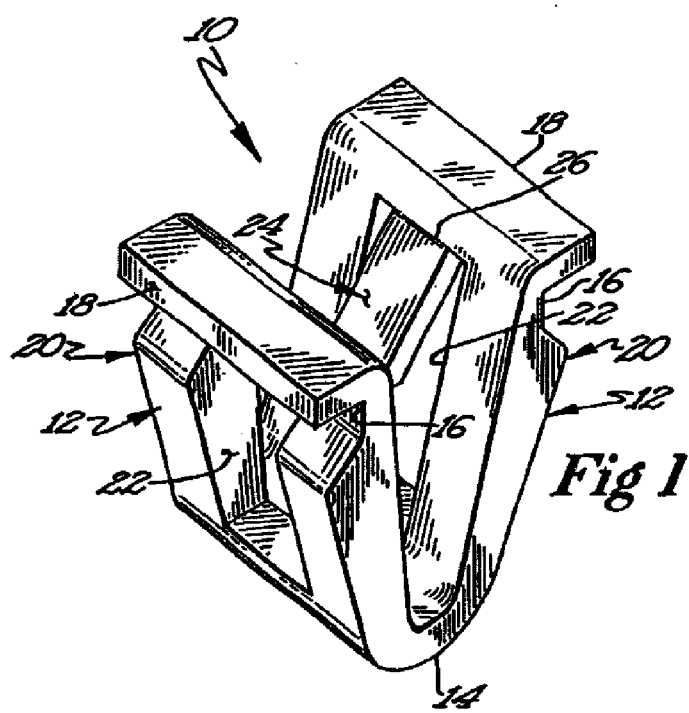
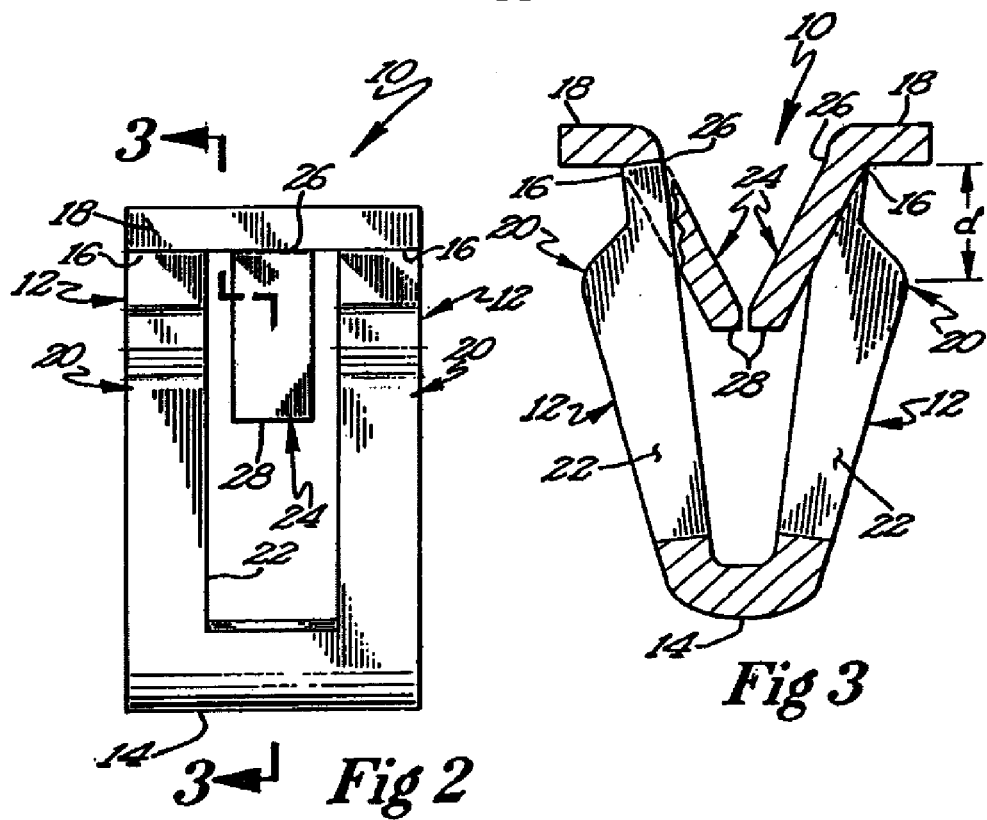

What is claimed is:

1. A retaining clip comprising:
   a "U"-shaped body having a pair of legs flexibly connected at their bottom ends and spaced apart sufficiently to receive therebetween a blade fastener having formed therethrough an aperture, the legs having a tapered thickness;
   a pair of head projections, each head projection being connected to and extending laterally from a top end of the respective legs;
   a pair of detent structures, each detent structure comprising an indentation formed into each of the respective legs; and,
   a pair of retaining tabs, each retaining tab being disposed within and extending inwardly from a tab aperture formed through each leg, the retaining tabs being inclined toward the bottom ends of the legs and being further constructed and arranged to permit the blade fastener to be inserted and retained therebetween, the retaining tabs engaging the blade fastener in such a manner that a withdrawal force applied to the blade fastener is opposed by the retaining tabs such that substantially all of the withdrawal force is borne by the retaining tabs in compression.

2. The retaining clip of claim 1 wherein the legs of the U-shaped body of the retaining clip are biased outwardly such that when the body of the retaining clip is inserted into a window formed through a first panel until the head projections contact a first side of the first panel, the outward bias of the legs will cause a portion of the detent structures of the respective legs to engage a second surface of the first panel so as to securely retain the retaining clip within the window.

3. The retaining clip of claim 1 wherein the blade fastener is secured to and extends from an undersurface of a second panel.

4. The retaining clip of claim 3 wherein the blade fastener of the second panel is inserted into and retained within the retaining clip.

5. The retaining clip of claim 1 wherein substantially all of the withdrawal force is opposed by the retaining tabs in compression.

6. The retaining clip of claim 1 wherein a majority of the withdrawal force applied to the blade fastener is borne in compression by the retaining tabs.

7. The retaining clip of claim 1 wherein the tip of each retaining tab is sharp edged.

8. The retaining clip of claim 7 wherein the tip of each retaining tab is constructed and arranged to engage the blade fastener such that the force within each retaining tab to oppose a withdrawal force applied to the blade fastener is borne substantially in compression by the retaining tabs.

9. The retaining clip of claim 7 wherein the tip of each retaining tab is constructed and arranged to engage the blade fastener so that a retaining force engendered within the retaining tabs to oppose the withdrawal force applied to the blade fastener is borne in the majority by the retaining tabs in compression.

10. The retaining clip of claim 1 wherein an insertion force applied to the retaining clip to seat the blade fastener therein is about two pounds.

11. The retaining clip of claim 1 wherein each retaining tab forms an acute angle with the blade fastener as the withdrawal force is applied to the blade fastener, the angle between each retaining tab and the blade fastener being such that substantially the entire withdrawal force applied to the blade fastener is borne by the retaining tabs in compression.

12. The retaining clip of claim 1 wherein each retaining tab forms an acute angle with the blade fastener as the withdrawal force is applied to the blade fastener, the angle between each retaining tab and the blade fastener being such that the withdrawal force applied to the blade fastener is borne by the retaining tabs primarily in compression.

13. The retaining clip of claim 1 wherein the material from which the retaining clip is made is sufficiently rigid to permit the retaining tabs thereof to resist the withdrawal force applied to the blade fastener substantially in compression.

14. The retaining clip of claim 1 comprising a plurality of pairs of retaining tabs.

15. The retaining clip of claim 1 wherein the retaining clip has a width less than its height as measured from the retaining heads to the bottom end of the legs.

16. The retaining clip of claim 1 wherein the retaining clip has a width greater than the height thereof.

17. The retaining clip of claim 1 wherein a plurality of retaining clips are addressed to a single blade fastener.

18. A retaining clip comprising:
a "U"-shaped body having a pair of legs flexibly connected at their bottom ends and spaced apart sufficiently to receive therebetween a blade fastener having formed therethrough an aperture;
a pair of head projections, each head projection being connected to and extending laterally from a top end of the respective legs;
a pair of detent structures, each detent structure extending laterally from an exterior surface of the respective legs at a predetermined distance from the head projection of each leg; and
a pair of retaining tabs, each retaining tab being disposed within an extending inwardly from tab aperture formed through each leg, the retaining tabs being inclined toward the bottom ends of the legs and being further constructed and arranged to permit the blade fastener to be inserted and retained therebetween, the retaining tabs engaging the blade fastener in such a manner that a withdrawal force applied to the blade fastener is opposed by the retaining tabs such that substantially all of the withdrawal force is borne by the retaining tabs in compression; and,
a pair of support bars, each support bar being secured to a respective leg of the retaining clip across the tab aperture, the respective support bars being also secured to the retaining tab secured within the respective tab apertures.

19. A retaining clip comprising:
a "U"-shaped body having a pair of legs flexibly connected at their bottom ends and spaced apart sufficiently to receive therebetween a blade fastener having formed therethrough an aperture;
pair of head projections, each head projection being connected to and extending laterally from a top end of the respective legs;
a pair of detent structures, each detent structure extending laterally from an exterior surface of the respective legs at a predetermined distance from the head projection of each leg; and
a pair of retaining tabs, each retaining tab being disposed within an extending inwardly from tab aperture formed through each leg, the retaining tabs being inclined toward the bottom ends of the legs and being further constructed and arranged to permit the blade fastener to be inserted and retained therebetween, the retaining tabs engaging the blade fastener in such a manner that a withdrawal force applied to the blade fastener is opposed by the retaining tabs such that substantially all of the withdrawal force is borne by the retaining tabs in compression the tip of each retaining tab having formed therein a notch that engages the edge of the aperture formed through the blade fastener.

20. A retaining clip comprising:
a "U"-shaped body having a pair of legs flexibly connected a their bottom ends and spaced apart sufficiently to receive therebetween a blade fastener having formed therethrough an aperture, the legs having a tapered thickness;
a pair of head projections, each head projection being connected to and extending laterally from a top end of the respective legs;
a pair of detent structures, each detent structure comprising an indentation formed into each of the respective legs; and,
a pair of retaining tabs, each retaining tab being disposed within and extending inwardly from a tab aperture defined between each of the legs and the head projections, respectively, each of the retaining tabs being secured directly to the head projection of their respective legs, the retaining tabs being inclined toward the bottom ends of the legs and being further constructed and arranged to permit the blade fastener to be inserted and retained therebetween, the retaining tabs engaging the blade fastener in such a manner that a withdrawal force applied to the blade fastener is opposed by the retaining tabs substantially in compression, the retaining tab forming an acute angle with the blade fastener as the withdrawal force is applied to the blade fastener.

21. The retaining clip of claim 20 wherein an insertion force of about two pounds is required to seat the retaining clip on the blade fastener.

22. A retaining clip comprising:
- a "U"-shaped body having a pair of legs flexibly connected at their bottom ends and spaced apart sufficiently to receive therebetween a blade fastener having formed therethrough an aperture;
- a pair of head projections, each head projection being connected to and extending laterally from a top end of the respective legs;
- a pair of detent structures, each detent structure extending laterally from an exterior surface of the respective legs at a predetermined distance from the head projection of each leg; and,
- a pair of retaining tabs, each retaining tab being disposed within and extending inwardly from a tab aperture formed through each leg, the retaining tabs being inclined toward the bottom ends of the legs and being further constructed and arranged to permit the blade fastener to be inserted and retained therebetween, the retaining tabs engaging the blade fastener in such a manner that a withdrawal force applied to the blade fastener is opposed by the retaining tabs substantially in compression, the retaining tab forming an acute angle with the blade fastener as the withdrawal force is applied to the blade fastener, the tips of each of the retaining tabs further comprising a notch constructed and arranged to engage a lip of the aperture formed through the blade fastener.

23. A mechanism for securing together a first panel and a second panel, the mechanism comprising:
- a retaining clip having a "U"-shaped body formed of a pair of legs flexibly connected at their bottom ends and spaced apart sufficiently to receive therebetween a blade fastener having formed therethrough an aperture, the legs having a tapered thickness and each of the legs having extending laterally from an exterior surface thereof a head projection that is secured to the end of each of the legs and a detent structure formed by an indentation made into the leg adjacent the head projection so as to create a shoulder a predetermined distance from the head projections, each leg further having formed therein a tab aperture having disposed therein a retaining tab that extends from adjacent the head projection inwardly toward the bottom of the legs, the retaining tabs being constructed and arranged to permit the blade fastener to be inserted therebetween and to thereafter engage the blade fastener in such a manner that a withdrawal force applied to the blade fastener is opposed by the retaining tabs substantially in compression, the retaining tabs forming an acute angle with the blade fastener as the withdrawal force is applied to the blade fastener, the retaining clip being first engaged with the blade fastener, the blade fastener being itself secured to the second panel and the assembled retaining clip and blade fastener subsequently being inserted into a window formed through the first panel so as to secure the second panel to the first panel.

24. A retaining clip comprising:
- a "U"-shaped body having a pair of legs flexibly connected at their bottom ends and spaced apart sufficiently to receive therebetween a blade fastener;
- a pair of head projections, each head projection being connected to and extending laterally from a top end of the respective legs;
- a pair of detent structures, each detent structure extending laterally from an exterior surface of the respective legs at a predetermined distance from the head projection of each leg; and
- a pair of retaining tabs, each retaining tab being disposed within and extending inwardly from a tab aperture formed through each leg, the retaining tabs being inclined toward the bottom ends of the legs and being further constructed and arranged to permit the blade fastener to be inserted and retained therebetween, the retaining tabs engaging the blade fastener in such a manner that a withdrawal force applied to the blade fastener is opposed by the retaining tabs such that substantially all of the withdrawal force is borne by the retaining tabs in compression, the blade fastener further comprising a series of ridges positioned so as to be engaged by the tips of the retaining tabs when the blade fastener has been fully inserted into the retaining clip.

25. A retaining clip comprising:
- a "U"-shaped body having a pair of legs flexibly connected at their bottom ends and spaced apart sufficiently to receive therebetween a blade fastener having formed therethrough an aperture, the legs having a tapered thickness;
- a pair of head projections, each head projection being connected to and extending laterally from a top end of the respective legs; and,
- a pair of retaining tabs, each retaining tab being disposed within a tab aperture formed through each leg, the retaining tabs being secured at their respective bases within the tab apertures adjacent the head projections and being inclined inwardly toward the bottom ends of the legs, the retaining tabs being further constructed and arranged to permit the blade fastener to be inserted and retained therebetween, the retaining tabs engaging the blade fastener in such a manner that a withdrawal force applied to the blade fastener is opposed by the retaining tabs such that substantially all of the withdrawal force is borne by the retaining tabs in compression.

26. The retaining clip of claim 25 further comprising pair of detent structures, each detent structure extending laterally from an exterior surface of the respective legs at a predetermined distance from the head projection of each leg to retain the retaining clip in a window formed through a panel, the detent structures engaging an under surface of the panel as the head projections of the legs engage the upper surface of the panel.

* * * * *

UNITED STATES PATENT AND TRADEMARK OFFICE
CERTIFICATE OF CORRECTION

PATENT NO. : 6,796,006 B2
DATED : September 28, 2004
INVENTOR(S) : Hansen

It is certified that error appears in the above-identified patent and that said Letters Patent is hereby corrected as shown below:

Drawings,
Sheet 1, delete in entirety Figures 1, 2 and 3 and replace with the attached Formalized Figures 1, 2 and 3.
Sheet 2, delete Figure 4 and replace with the attached Formalized Figure 4
Sheet 4, delete Figure 7 and replace with the attached Formalized Figure 7

Column 7,
Line 49, delete "retaining heads" and replace with -- head projections --
Line 67, delete "within an extending" and replace with -- within and extending --
Line 67, delete "inwardly from tab" and replace with -- inwardly from a tab --

Column 8,
Line 29, delete "within an extending" and replace with -- within and extending --
Line 29, delete "inwardly from tab" and replace with -- inwardly from a tab --

Signed and Sealed this

Eighth Day of February, 2005

JON W. DUDAS
*Director of the United States Patent and Trademark Office*